2,949,342

METHOD OF PRODUCING SODIUM AND POTASSIUM SULPHATE FROM PEGMATITE

Alfred M. Thomsen, 265 Buckingham Way, Apt. 402, San Francisco, Calif.

No Drawing. Filed Mar. 27, 1958, Ser. No. 724,252

2 Claims. (Cl. 23—121)

This application is a continuation-in-part, of a prior application bearing the name, "Method of processing granitoid substances," and Ser. No. 493,543, filed March 10, 1955, and now abandoned. Inasmuch as a pegmatite is considered as originating from a granite magma it consists essentially of the complex silicates of the original magma, differentiation having removed most of the quartz. One exception is the so-called mairolitic granite in which the pegmatite differentiation has taken the form of minute aggregates within the granite mass itself. Obviously, such material is also rightly considered of the pegmatite class, true granite being a differentiated product. In the case of the mairolitic granite, the constituents, normally absent from granite, are still present though to a lesser extent than in the true pegmatites. Such material is beryl, lithia minerals, pitchblende, microlite, euxenite, zircon, monazite, and others too numerous to mention specifically. A peculiarity of the pegmatites is that such rare material is often found in extremely large crystals, such crystals being readily separated by hand sorting. Unfortunately, such finds are also rare, the mass of the rare metals being found as minute particles scattered throughout the pegmatite.

An average pegmatite consists essentially of feldspar and the various micas, with tiny quantities of the rare minerals distributed throughout its mass. In special cases, spodumene and lepidotite may be relatively abundant, but such occurences are rare. Beryl is never abundant nor are any of the before mentioned minerals. To obtain the contained rare metals in commercial quantities it is, therefore, essential that the pegmatite be treated as a whole, hence the part relegated to the alkali metals, aluminum and silica becomes of the utmost economic importance. Were these substances discarded it would be impossible to work for the rare metals alone. Contrariwise, as these valuable substances are obtained as by-products, they do carry much of the total cost.

As a means of fully explaining my process I will take a typical, though rather rich, pegmatite containing in addition to the complex alumina silicates some 2 lbs. of tantalum-columbium (as microlite), 5 lbs. of lithium (as lepidolite) and 1 lb. of beryllium (as beryl) per ton of rock. The alkali metals constitute about 15% of the total, calculated as oxides, some 80% being potassium and the rest sodium. Aluminum, calculated as the oxide, represents about 17%. Silica accounts for about 55% and the remainder is made up of a mixture of magnesium, calcium, iron, and a host of minor items.

This material is now ground so as to pass an 80 mesh screen, mixed with its weight of alkali metal sulphate, recycled as a solution from a later step in my process, and approximately 25% of its weight of carbon, of any type from charcoal to carbon black. The wet slurry is dried, preferably in a rotary kiln from which it will issue in the form of small pebbles. By such re-cycling it is obvious that the ratio of potassium to sodium in the pegmatite is not disturbed.

This "pebbled" product is ideal feed for the electric furnace. An easily fusible and very liquid slag is produced as nearly half the weight of said slag consists of alkali metal oxides. The gases issuing from the furnace consist essentially of carbon monoxide and volatilized sulphur. It is burned with excess of air yielding sulphur dioxide, carbon dioxide, nitrogen, and excess air. It is converted to sulphuric acid in any conventional manner but I prefer the so-called "tower system" because of the interference of the large amount of carbon dioxide. It is unnecessary to make strong acid, 50° Bé. being entirely satisfactory.

The slag yielded by the furnace is best quenched forthwith in agitated water as this facilitates subsequent grinding. Such grinding should be to 200 mesh, or even finer. After drying, this finely powdered slag is mixed with the acid before described in such an amount as will satisfy the requirement of all the bases contained therein with an excess of about 5%. Such matters must be determined by analysis and corrected in actual practice by testing the silicious residue with a further quantity of acid.

The reaction is favored by gentle heating after which the chemical reaction should furnish its own heat so that a hard solid cake remains. I prefer to perform this step in a rotary kiln so that a pebbled product is once more obtained. It is, of course, desirable to have the final product in such form that it is easily handled by automatic machinery. Said product is now disintegrated in water, yielding a solution of sulphates and a residue that is essentially silica. Separation is made in any conventional manner, but I prefer a leaf filter as this is an excellent device for the thorough washing of the insoluble, hydrated silica. Slow filtering can be corrected by using a little higher heat applied after the reaction.

Even as obtained this silica is a valuable product as it possesses about the same power to adsorb impurities that are found in activated clay. In view of its structure it is also an excellent starting point for sodium silicate which, in turn, is the start of the major catalysts used in modern industry. By itself, as obtained solely by drying, it can be converted into an excellent catalyst by precipitating upon it the active material, from alumina to nickel, the active silica serving as a good support in view of its enormous internal area.

The solution of sulphates separated from this silica is next precipitated by commingling it with alkali metal carbonate as long as a precipitate is produced, said precipitate consisting essentially of aluminum hydroxide and ferrous carbonate. Conventional methods only are required to separate these constituents, such as treatment with a caustic alkali to yield the corresponding aluminate, a form well suited to the manufacture of catalysts. Such methods are manifestly beyond the scope of this disclosure.

Owing to the small amount of both beryllium and lithium present in the raw material there will be no precipitation of either element with the aluminum hydroxide. If a larger amount of beryllium were present it might be co-precipitated, but in this event it is easily extracted afterwards by using a solution of ammonium carbonate. The relatively great solubility of lithium carbonate makes its co-precipitation most unlikely. After the removal of the carbonate precipitate, the solution is commingled with a caustic alkali which will precipitate resident beryllium as the insoluble hydroxide. When such precipitate has been separated, the resident lithium is precipitated as phosphate by the addition of an adequate amount of alkali metal phosphate.

After separation of this lithium product the solution contains little save alkali metal sulphates. It is desirable to preserve in these salts the same ratio of sodium to potassium present in the pegmatite, hence all alkali metal compounds called for to produce the various precipitations should be prepared from the mixture of sulphates left after said precipitations. A number of conventional methods are available so I will name but one, the old Leblanc soda process, which though obsolete today yet has in its time produced many millions of tons of alkali. It has been found as operative on potash as on soda so it is well suited for the purpose. Obviously no description is necessary.

After such use, the remainder of the solution is, in part, re-cycled to the original start of the operation as the source of the sulphates called for in preparing a product suitable for the electric furnace smelting. The final remainder, representing all the sodium and potassium present in the pegmatite, is thus obtained as a product easily separated into its constituent parts and marketed as the corresponding compounds of sodium and potassium. Such separation is likewise entirely conventional so no explanation is needed.

Columbium and tantalum are very difficult to analyze for when present in such minute amount as herein indicated. Such being the case it would seem preposterous to specify a chemical separation as of merit. Fortunately, the mineral microlite is very heavy and the accepted analytic method is a careful gravity separation of the heavy metals in such a pegmatite and then an analysis of this concentrate, the result being then calculated back to the mineral. It is, therefore, desirable to take the ground pegmatite, prior to fusion, and send it over a Wilfley table, or other concentrating device, separate such heavy mineral as possible and smelt the tailings as previously described.

I take advantage of this phenomenon to obtain said columbium-tantalum minerals. With pegmatite already ground, a necessary preparation according to my process in any event, it costs very little to add or insert a concentrating step. I thus obtain a concentrate of the heavy minerals for conventional processing which is outside of this disclosure, but which becomes an economic step when taken in conjunction with the subsequent fusion of the tailings left in said concentration step.

The reverse of this operation will now be considered. Quartz, as an ingredient of pegmatite, is generally barren and it would be desirable to have as little present as possible. Inasmuch as it yields only silica and no by-products it would be desirable to separate it, and reject it, before the fusion step. Flotation is today used advantageously to separate unwanted feldspar from "Glass Sand" and to improve the quality of feldspar desired in the ceramic and enamelling trades. It is, therefore, unnecessary to describe this technique herein, but merely to state its application, to wit: The tailings from the afore described gravity concentration are now subjected to flotation to remove unwanted quartz to the extent economically desirable.

In presenting an illustration in which I have given the full embodiment of my process I introduce both these steps and thus obtain a more favorable product for the more expensive fusion step. To summarize: Pegmatite is ground, heavy minerals removed by gravity concentration, un-wanted quartz by subsequent flotation, the residual commingled with re-cycled alkali metal sulphates from a later step, fused in an electric furnace, sulphuric acid made from the furnace gas and used to sulphate the furnace slag, silica separated by a water leach, soluble sulphates progressively precipitated by alkali metal carbonates, hydroxides and phosphates, residual sulphates, partly re-cycled or recovered. Having thus fully described my process,

I claim:
1. The method of processing a pegmatite, consisting essentially of aluminum-potassium-sodium silicate, with iron, calcium, magnesium, lithium and beryllium as combined complex silicates in subordinate amounts, which comprises; grinding said pegmatite with water to form a thin slurry; passing said slurry over gravity concentrating devices so as to remove as a concentrate most of the heavy minerals found in said pegmatite; passing the tailings from said gravity concentration over flotation devices to remove at least a portion of the free silica, quartz, contained therein; commingling the residual pegmatite minerals, after such purification and constituting the bulk of the original pegmatite, with one-fourth of its weight of carbon and with a mixture of sodium and potassium sulphates having the same sodium-potassium ratio as that of the purified pegmatite, said mixture of sodium and potassium sulphates being obtained and re-cycled from a later step in the process, the amount of such additive sulphates being approximately equal to weight of the commingled pegmatite; drying said mixture to produce a lumpy product; fusing said dried product with electrically generated heat to yield a complex silicate slag and a gaseous mixture of sulphur and carbon monoxide; burning said gaseous mixture with admixture of air to yield a gas containing sulphur dioxide and converting said sulphur dioxide into sulphuric acid of approximately 50° Bé.; grinding said complex silicate slag to a finely ground condition commingling said acid with the said finely ground complex silicate slag thus converting the resident metals into sulphates with attendant liberation of silica; commingling said sulphated material with water to produce a solution of metallic sulphates and insoluble, hydrated silica; separating said silica; commingling the solution of metallic sulphates with sufficient alkali metal carbonate to precipitate iron and aluminum as insoluble compounds and separating said insolubles; commingling the resultant solution with alkali metal hydroxide to precipitate beryllium as hydroxide and removing said hydroxide; commingling the resultant solution with a water-soluble, alkali metal phosphate to precipitate lithium as phosphate, and removing said phosphate; re-cycling such an amount of the residual solution, after the removal of lithium phosphate, as necessary to fulfill the requirements of the previous addition of alkali metal sulphates as previously specified, the unused remainder serving as a source of the sulphates of potassium and sodium.

2. The method of processing a pegmatite set forth in claim 1, with the added step that the insoluble iron-aluminum compound obtained therein be commingled with a solution of ammonium carbonate to remove therefrom any co-precipitated beryllium hydroxide.

References Cited in the file of this patent
UNITED STATES PATENTS

| | | |
|---|---|---|
| 1,062,278 | Hart | May 20, 1913 |
| 1,172,420 | Bassett | Feb. 22, 1916 |

FOREIGN PATENTS

| | | |
|---|---|---|
| 22,557 of 1912 | Great Britain | May 22, 1913 |
| 502,987 | Great Britain | Mar. 29, 1939 |

OTHER REFERENCES

Mellor: "A Comprehensive Treatise on Inorganic and Theoretical Chemistry," Longmans, Green and Co., N.Y., vol. 4, 1923, pp. 225 and 226.

Jacobson: "Encyclopedia of Chemical Reactions," Reinhold Publishing Corp., N.Y., vol. 4, 1951, p. 382.